United States Patent [19]
Yeh et al.

[11] Patent Number: 4,763,546
[45] Date of Patent: Aug. 16, 1988

[54] SIMPLE TUBELESS TIRE PATCHER

[76] Inventors: Teng-Hsun Yeh, 501, Sec. 2, Ta Hsi Rd., Kuang Pin Li, Hsi Hu Chen; Sien-Shigong Lai, 235, Sec. 3, Yuan Lu Rd., Hsi Hu Chen,, both of Chung Hwa Hsien, Taiwan

[21] Appl. No.: 90,881

[22] Filed: Aug. 31, 1987

[51] Int. Cl.$^4$ .............................................. B60C 25/16
[52] U.S. Cl. ..................................... 81/15.7; 152/320; 156/97
[58] Field of Search ......................... 156/97; 81/15.7

[56] References Cited
U.S. PATENT DOCUMENTS

| | | | |
|---|---|---|---|
| 2,866,494 | 12/1958 | Sanderson | 156/97 |
| 2,990,736 | 7/1961 | Crandall | 156/97 |
| 3,175,432 | 3/1965 | Crandall | 81/15.7 |
| 3,198,039 | 8/1965 | Price | 156/97 |

Primary Examiner—Willard Hoag
Attorney, Agent, or Firm—Varndell Legal Group

[57] ABSTRACT

A simple tubeless tire patcher, especially a tool comprising a T-handle and an awl with a notch to press a stick of patch into a hole in the tire to be a good patch, characterized by having two parallel flat surfaces on two opposite sides of the awl for accommodating a stick of colloid nylon patch so that it can be brought into the hole in the tire by the awl after it is turned by the hand with the flat surfaces and the top of the base proping aside the ends of the stick patch it will be left in hole after the awl is pulled out and become a good patch.

1 Claim, 2 Drawing Sheets

SIMPLE TUBELESS TIRE PATCHER

BACKGROUND AND SUMMARY OF THE INVENTION

High-speed tubeless tires have been widely used. Punctures of such tires are repaired by inserting a rubber patch in the hole and by use of the contraction of the elastic rubber tire. Usually, the inserting is achieved by a hammer or press gun. There are two press guns now available. One throws the rubber patch directly into the puncture and the other pushes the lever repeatedly to press the rubber patch into the hole. However, these methods have the following disadvantages:

1. Since the tire is elastic, high stress will occur when the patch is hammered in. Plus the friction, it is every difficult to hammer the patch into the tire. Furthermore, damage would be caused to the tire when hammering.

2. The two kinds of press guns are so expensive that they can not be used widely except tire repair shops or garages.

To eliminate these disadvantages, this invention was developed. So the main object of this invention is to provide a simple tubeless tire patcher which, comprising a T-handle and a threaded awl with two flat surfaces and a notch to accommodate a stick of patch, can penetrate the tire after being turned and press the stick patch into the puncture, and which, with the top of awl base propping aside the ends of the stick patch, will leave the stick patch in the hole after being pulled out in such way that the two flat surfaces face forward and backward respectively.

DETAILED DESCRIPTION OF THE PREFERRED EMBODIMENT

Figure 1:
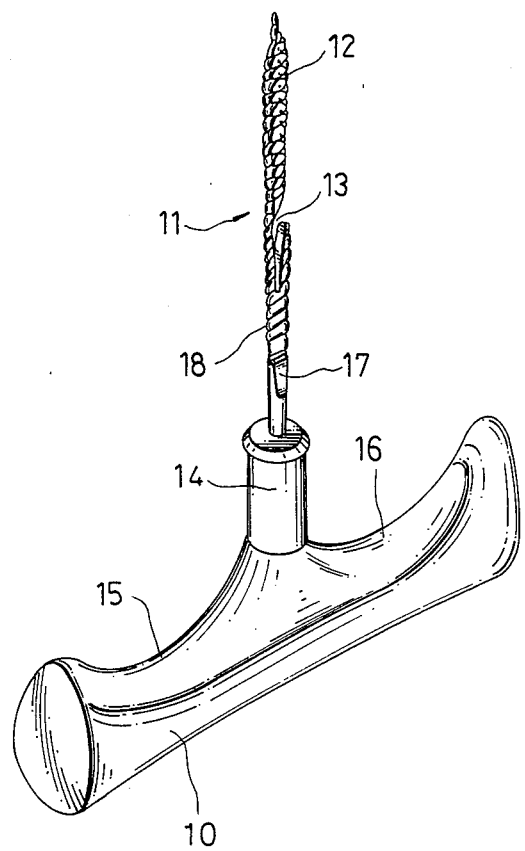
FIG. 1 is a perspective view of the simple tubeless tire patcher of this invention.

Referring now to the drawings, the nature of this invention is described in detail as follows:

As shown in FIG. 1, the simple tubeless tire patcher of this invention comprises a T-handle 10 and a threaded awl 11. The T-handle 10 is made in an integral part and consists of an awl base 14 and two ridges 15, 16 on both sides of the base 14 to facilitate holding with the hand. The threaded awl 11 fixed to the base 14 consists of a thread 12 at the front end, a notch 13 in the middle, and two flat surfaces 17, 18 on opposite sides. The notch 13 is designed to accommodate a stick of colloid nylon compound.

Figure 2:
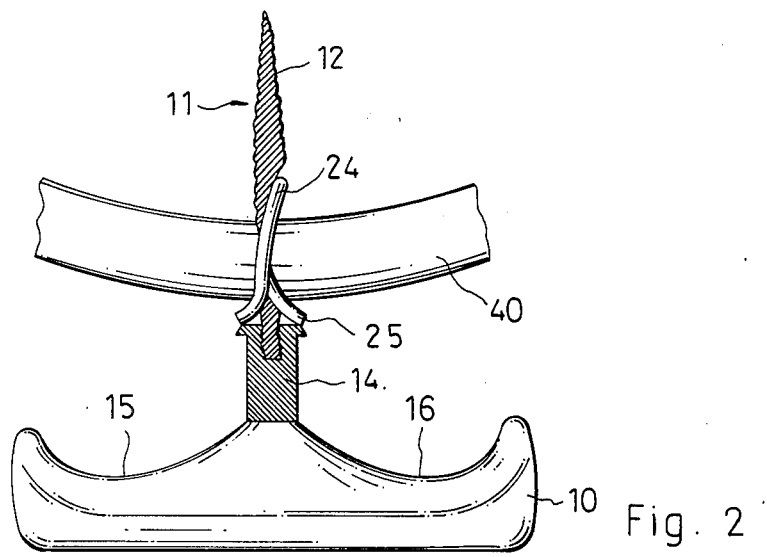
FIG. 2 illustrates the application of the said patcher with the threaded awl penetrating the tire.
Figure 3:
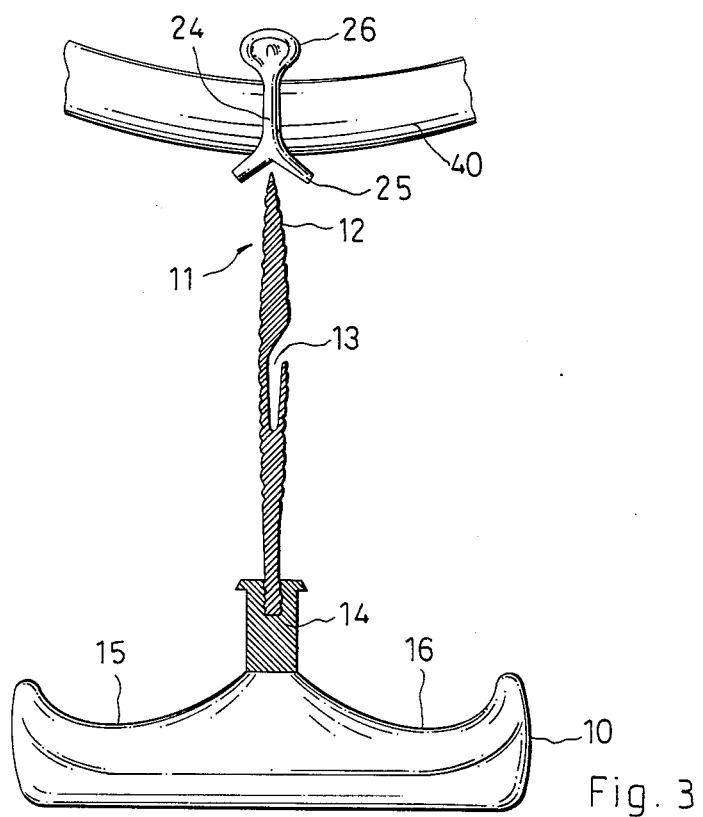
FIG. 3 illustrates the application of the said patcher with the stick patch remaining in the puncture after the said patcher is pulled out by being turned.

As shown in FIGS. 2 and 3, when the thread awl 11 is turned and penetrates the tubeless tire 40, the stick of patch 24 is brought into the tire 40 by the turning awl 11. Since the ends 25 of the stick patch 24 are pressed and propped aside by the top of the base 14, the stick patch 24 will not be entirely pulled into the tire 40, which will result in failure to mend the hole. The two flat surfaces on both sides of the threaded awl 11 is turned until the flat surfaces face forward and backward and pulled out of the tubeless tire 40. The stick patch 24 pressed by the contracting tire 40 as the awl 11 is pulled out forms a knob 26 at the puncture inside the tire 40 and is not brought out by the awl 11 as it is pulled out of the tire 40. Thus, the inside knob 26 and the outside ends 25 connected with the patch material left in the hole become a good patch.

We claim:

1. A simple tubeless tire patcher comprising a T-handle consisting of an awl base and two ridges beside the base, and an awl consisting of a thread at the front end, a notch in the middle and two flat surfaces on opposite sides, and constructed in such way that the flat surfaces will reduce friction of the stick patch and the top of the base will prop aside the ends of the stick patch and prevent them from being pulled out when the awl is pulled out of the tire with the two flat surfaces facing forward and backward.

* * * * *